United States Patent [19]

Imori et al.

[11] Patent Number: 4,683,390
[45] Date of Patent: Jul. 28, 1987

[54] TERMINAL STRUCTURE FOR AN AUTOMOTIVE AC GENERATOR

[75] Inventors: Hideo Imori; Katsumi Adachi, both of Himeji, Japan

[73] Assignee: Mitsubishi Denki Kabushiki Kaisha, Tokyo, Japan

[21] Appl. No.: 849,872

[22] Filed: Apr. 9, 1986

[30] Foreign Application Priority Data

Apr. 10, 1985 [JP] Japan ............................ 60-54520[U]

[51] Int. Cl.$^4$ .............................................. H01R 3/00
[52] U.S. Cl. ................................ 310/71; 339/116 R; 339/198 R
[58] Field of Search ............... 310/68 D, 71; 339/116, 339/154 R, 154 A, 156, 198 R, 224, 231, 232, 263

[56] References Cited

U.S. PATENT DOCUMENTS

| | | | |
|---|---|---|---|
| 1,108,883 | 9/1914 | Bijur | 339/232 |
| 1,847,972 | 3/1932 | Morris | 339/232 |
| 3,609,428 | 9/1971 | Cotton | 310/68 D |
| 4,473,264 | 9/1984 | Julian et al. | 339/116 R |
| 4,483,910 | 11/1984 | Julian | 339/116 R |
| 4,531,806 | 7/1985 | Hsieh | 339/198 R |

FOREIGN PATENT DOCUMENTS 1177747  1/1970  United Kingdom ................ 339/277

Primary Examiner—Patrick R. Salce
Assistant Examiner—D. L. Rebsch
Attorney, Agent, or Firm—Leydig, Voit & Mayer

[57] ABSTRACT

An improved terminal structure for an automotive AC generator particularly designed to reduce the axial space required for connection with an external member, thereby improving connectability. The generator includes a housing rotatably supporting a rotary shaft thereof, and a rectifier accommodated in the housing and having an output terminal assembly. The output terminal assembly comprises an axial output terminal member disposed axially within the housing and having its one end projected outwardly from the housing in the axial direction, and a radial output terminal member connected at its one end with that end of the axial output terminal member projected from the housing. The radial output terminal member extends radially along the outer peripheral surface of the housing and has its other end extending substantially perpendicular to the axis of the rotary shaft for connection with an external member.

6 Claims, 4 Drawing Figures

TERMINAL STRUCTURE FOR AN AUTOMOTIVE AC GENERATOR

BACKGROUND OF THE INVENTION

1. Field of the Invention

This invention relates generally to an automotive AC generator, and more particularly, to an improved terminal structure therefor.

2. Description of the Prior Art

FIGS. 3 and 4 are a plan view and a cross sectional view, respectively, showing the essential parts of an automotive AC generator of a conventional type. In these Figures, reference numeral 1 designates a cup-shaped rear bracket of the automotive AC generator on which are fixedly mounted a pair of heat sinks 2 to each of which are soldered six diodes (not shown) forming a three-phase bridge rectifier circuit which acts as a rectifier. The diodes are adapted to be connected with a circuit board 4 on which an auxiliary diode 5 is supported. An air-regulating plate 6 is fixedly mounted on the circuit board 4 for regulating the flow of air which is generated when the AC generator is driven. An output terminal 7 in the form of a threaded bolt is firmly attached to the plus side (the upper side in FIG. 4) of the pair of heat sinks 2 which are disposed one over the other with a first insulator 8 interposed therebetween for electrical insulation. Disposed between the rear bracket 1 and the output terminal 7 is a second insulator 10 for electrical insulation. A nut 9 is threaded over the threaded output terminal 7 so as to assemble together the plate 6, the circuit board 4, the heat sinks 2, the first insulator 8, the rear bracket 1 and the second insulator 10.

With the above-described conventional terminal structure for an automotive AC generator, assembly of the output terminal components is effected simply by placing one over another, but it involves problems in that the output terminal 7 projects axially, i.e. in the direction parallel to the rotary shaft of the generator, from the rear bracket 1, and that it is necessary to connect an external member such as a harness at the vehicle body side with the output terminal 7 in the axial direction. In particular, such a connection is very difficult if the engine room of the vehicle is relatively limited in space.

SUMMARY OF THE INVENTION

In view of the above, the present invention is intended to solve the above-mentioned problems of the prior art, and has for its object the provision of a terminal structure for an automotive AC generator as described above in which an output terminal assembly has an outer end portion extending perpendicular to the axial direction of the generator so that the output terminal assembly can be connected with the external member at a location outside the generator housing, and thus the generator with the output terminal assembly can be mounted on the engine without any difficulty and free from any restriction on the axial space, which in turn improves the efficiency of the mounting operation.

In order to achieve the above objects, according to the present invention, there is provided a terminal structure for an automotive AC generator including a housing rotatably supporting a rotary shaft of the generator, and a rectifier accommodated in the housing and having an output terminal assembly, wherein the output terminal assembly comprises an axial output terminal member disposed axially within the housing and having its one end projected outwardly from the housing in the axial direction, and a radial output terminal member connected at its one end with that end of the axial output terminal member which is projected from the housing, the radial output terminal member extending radially along the outer peripheral surface of the housing and having its other end extending substantially perpendicular to the axis of the rotary shaft for connection with an external member.

With the above construction, the output terminal member can be connected with the external member in a direction substantially perpendicular to the axis of the rotation shaft and thus does not suffer from any restrictions in the axial space for such connection. In addition, connection of the radial output terminal member and the axial output terminal member can be effected at a location outside the housing in a very simple manner, thereby substantially improving the assemblability thereof.

The above and other objects, features and advantages of the present invention will become apparent from the following detailed description of a presently preferred embodiment when taken in conjunction with the accompanying drawings.

DESCRIPTION OF THE PREFERRED EMBODIMENT

Now, a presently preferred embodiment of the present invention will be described with reference to the accompanying drawings.

Figure 1:
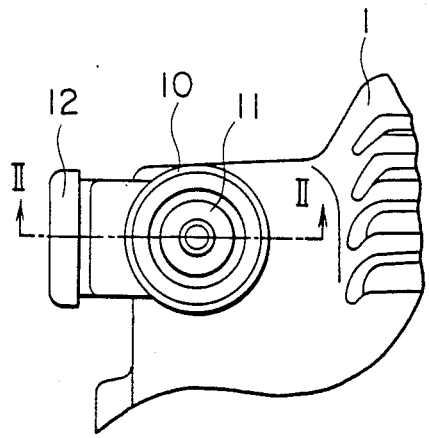
FIG. 1 is a plan view showing the essential parts of a terminal structure for an automotive AC generator constructed in accordance the present invention.
Figure 2:
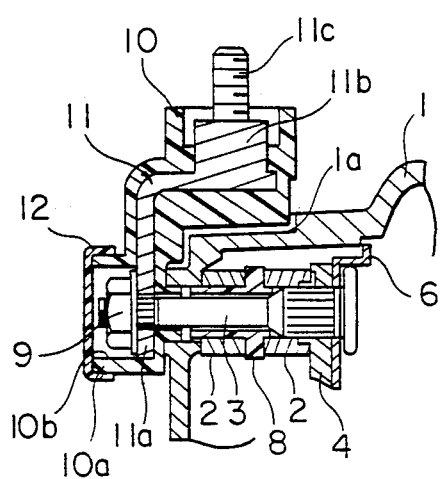
FIG. 2 is a cross sectional view taken along the line II—II of FIG. 1.
Figure 3:
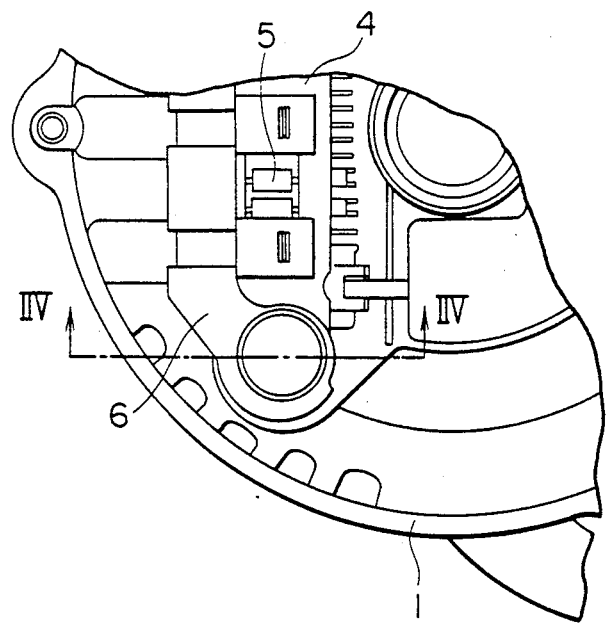
FIG. 3 is a plan view showing the essential parts of a prior art terminal structure for an automotive AC generator.
Figure 4:
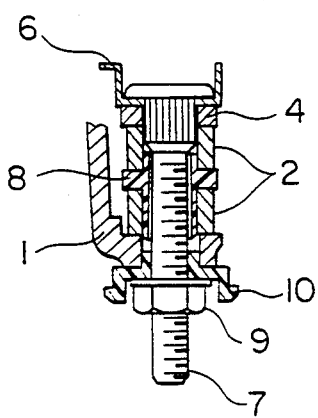
FIG. 4 is a cross section taken along the line IV—IV of FIG. 3.

FIGS. 1 and 2 are a plan view and a cross sectional view, respectively, of the essential parts of a terminal structure for an automotive AC generator in accordance with the present invention. In these Figures, a rear bracket 1 of an automotive AC generator constituting a part of the cup-shaped generator housing has an anti-rotation groove 1a formed on its rear end outer surface. Extending through the cup-shaped rear bracket 1, an axially extending output terminal member 3 in the form of a headed bolt is provided on which are mounted a rectifier circuit board 4 and an air-regulating plate 6 adjacent the head thereof. Fitted around the outer peripheral surface of the axially extending output terminal member 3 are a pair of annular heat sinks 2 with an annular insulator 8 interposed therebetween for insulation of these heat sinks 2 from each other as well as from the axial output terminal member 3. The axial output terminal member 3 extends axially through, and outwardly from, the end wall of the cup-shaped rear bracket 1 and is threaded at its outwardly extended end.

Fixedly attached by means of a nut 9 to the outwardly extended end of the axial output terminal member 3 is a radially (i.e., in the direction perpendicular to the rotary shaft of the generator) extending output member 11 which is formed at its radially inner end 11a with a through aperture into which is inserted the outer end of the axial output terminal member 3. The radially extending output terminal member 11 is integrally moulded with, and enclosed by, an insulation layer 10 of synthetic resin so that the terminal member 11 is electrically insulated from both the rear bracket 1 and the outside. The radial output terminal member 11 is integrally formed with a seat 11b for mounting an external terminal member such as a harness (not shown) at the side of the vehicle body. The seat 11b is provided with a threaded projection 11c extending radially outward therefrom substantially at right angles relative to the rotary shaft (not shown) of the generator for connection with the vehicle body side terminal member (not shown). As seen from FIG. 2, the radial output terminal member 11 is held from rotating relative to the rear bracket 1 by the fitting engagement thereof with the anti-rotation groove 1a in the rear bracket 1. The insulation layer 10 of synthetic resin is integrally formed with an axially extending annular projection 10a defining therein an opening 10b through which the nut 9 can be attached to the threaded outer end of the axial output terminal member 3. The opening 10b is closed by a cap 12 of electrically insulating material such as synthetic resin attached to the annular projection 10a so that the junction between the axial output terminal member 3 and the radial output terminal member 11 is electrically insulated and protected from the outside.

With the automotive AC generator terminal structure as constructed in the above manner, it is possible to connect the radial output terminal member 11 with the axial output terminal member 3 in a place radially outwardly of the rear bracket 1, thereby greatly improving connectability. Also, when the generator with the output terminal assembly is mounted on the engine of a vehicle, an external terminal member (not shown) such as the one at the vehicle body side can be connected with the radial output terminal member 11 substantially at right angles relative to the axis of the generator rotary shaft (not shown), as a consequence of which there is no restriction on the axial space for such connection. Thus, the axial length of the entire device is considerably reduced. Further, the insulation cap 12 of a simple construction provides electrical insulation from the outside at the junction between the axial output terminal member 3 and the radial output terminal member 11.

As in the foregoing description, the present invention provides the following unique and remarkable advantages.

Due to a simple construction in which an output terminal member has its one end connected with the outer end of an axial output terminal member of a rectifier projected outwardly from the generator housing, and its other end extending radially outward along the outer peripheral surface of the generator housing substantially at right angles relative to the rotary shaft of the generator for connection with an external terminal member, the axial length of the entire generator can be substantially reduced. In addition, upon mounting of the generator on the engine, there is no restriction on the axial mounting space, and the connection between the axial output terminal member and the radial output terminal member can be effected at a location outwardly of the generator housing without any difficulty, thus improving connectability to a material extent.

While a presently preferred embodiment of the present invention has been shown and described, it will be appreciated by those skilled in the art that various changes and/or modifications thereof can be made without departing from the spirit and scope of the appended claims.

What is claimed is:

1. A terminal structure for an automotive AC generator having a housing rotatably supporting a rotary shaft of the generator and a rectifier accomodated in the housing, said terminal structure comprising an output terminal assembly including an axial output terminal member connected to the rectifier and disposed axially within the housing, said axial output terminal member having one end extending through and projecting outwardly from an outer surface of the housing substantially parallel to the axis of the generator shaft, and a radial output terminal member connected with said one end of said axial output terminal member, said radial output terminal member extending radially adjacent the outer surface of the housing and having a terminal end extending substantially perpendicularly to the axis of the generator shaft for connection with an external wiring member, and anti-rotation means cooperating with the generator housing for preventing rotation of said radial output terminal member relative to the housing whereby said radial output terminal member is held substantially perpendicularly to the axis of the generator shaft.

2. A terminal structure for an automotive AC generator as set forth in claim 1 wherein said axial output terminal member is threaded at the end projecting from the housing and said radial output terminal member includes an opening for receiving therethrough the threaded end of said axial output terminal member for threaded engagement with a nut.

3. A terminal structure for an automotive AC generator as set forth in claim 1 wherein said radial output terminal member is covered with an insulation layer integrally molded therewith.

4. A terminal structure for an automotive AC generator as set forth in claim 3 further comprising a cap of insulating material attached to the insulation layer of said radial output terminal member for covering the threaded end of said axial output terminal.

5. A terminal structure for an automotive AC generator having a housing rotatably supporting a rotary shaft of the generator, and a rectifier accomodated in the housing, said terminal structure comprising an output terminal assembly including an axial output terminal member connected to the rectifier and disposed axially within the housing, said axial output terminal member having one end extending through and projecting outwardly from an outer surface of the housing substantially parallel to the axis of the generator shaft, and a radial output terminal member connected with said one end of said axial output terminal member, said radial output terminal member extending radially adjacent the outer surface of the housing and having a terminal end extending substantially perpendicularly to the axis of the generator shaft for connection with an external wiring member, said radial output terminal member being covered with an insulation layer integrally molded therewith, and an anti-rotation groove formed in the surface of the housing for preventing rotation of said radial output terminal member relative to the housing.

6. A terminal structure for an automotive AC generator as set forth in claim 1 wherein the radial output terminal member is covered with an insulation layer integrally moulded therewith.

* * * * *